United States Patent
Kupka et al.

(10) Patent No.: US 6,434,535 B1
(45) Date of Patent: *Aug. 13, 2002

(54) SYSTEM FOR PREPAYMENT OF ELECTRONIC CONTENT USING REMOVABLE MEDIA AND FOR PREVENTION OF UNAUTHORIZED COPYING OF SAME

(75) Inventors: Michael S. Kupka, Nacogdoches, TX (US); Michael G. Lundgren, Salt Lake City, UT (US)

(73) Assignee: Iomega Corporation, UT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/191,976

(22) Filed: Nov. 13, 1998

(51) Int. Cl.[7] ............................................. G06F 17/00
(52) U.S. Cl. ......................................... 705/24; 380/228
(58) Field of Search .............................. 705/41, 17, 56, 705/52, 53; 380/24, 201, 202, 228; 713/193

(56) References Cited

U.S. PATENT DOCUMENTS

| | | | |
|---|---|---|---|
| 4,785,361 A | * 11/1988 | Brotby | |
| 4,977,594 A | 12/1990 | Shear | 380/4 |
| 5,010,571 A | 4/1991 | Katznelson | 380/4 |
| 5,050,213 A | 9/1991 | Shear | 380/25 |

(List continued on next page.)

FOREIGN PATENT DOCUMENTS

| | | |
|---|---|---|
| EP | 0 302 710 A2 | 2/1989 |
| EP | 0 561 685 A2 | 9/1993 |
| EP | 0 665 486 A2 | 8/1995 |
| EP | 0 679 980 A1 | 11/1995 |
| JP | 2000010876 A * | 1/2000 |
| WO | WO 96/35158 | 11/1996 |
| WO | WO 97/14087 | 4/1997 |
| WO | WO 97/29416 | 8/1997 |
| WO | WO 98/02793 | 1/1998 |
| WO | WO 98/43398 | 10/1998 |

OTHER PUBLICATIONS

Derwent–Acc–No: 2000–147924, Horstmann, C. S., May 2001.*
Patent Abstracts of Japan, JP 10 333769 A, published Dec. 18, 1998, vol. 99(3), 1 page.

Primary Examiner—Hyung-sub Sough
Assistant Examiner—Pierre E. Elisca
(74) Attorney, Agent, or Firm—Woodcock Washburn LLP

(57) ABSTRACT

A system and method for distribution of electronic content over a network infrastructure and compensation of vendors of such data using prepaid media that includes a client device for operation by a user desiring to receive the electronic content and server that contains the electronic content and offering the electronic content for downloading to the client device via the network infrastructure. The client device communicates a unique identifier associated with a particular piece of media to which the electronic content is to be stored to the server. The server contacts a media tracking sever to determine if the media is valid and a remaining balance of the prepaid media. The cost of the electronic content to be downloaded is deducted from the remaining balance and credited to the vendor's account. The server then encrypts the electronic content using the unique identifier as a key and downloads the encrypted electronic content to the client computer, where the client computer writes the encrypted electronic content to the particular piece of media such that the encrypted electronic content may only be accessed from the particular piece of media. The electronic content is only accessible from only the one piece of media having the unique identifier and is not accessible from any other media having a different or no identifier.

38 Claims, 9 Drawing Sheets

U.S. PATENT DOCUMENTS

| | | | |
|---|---|---|---|
| 5,058,162 A | 10/1991 | Santon et al. | 380/25 |
| 5,291,598 A | 3/1994 | Grundy | 395/650 |
| 5,319,705 A | 6/1994 | Halter et al. | 380/4 |
| 5,379,433 A * | 1/1995 | Yamagishi | |
| 5,400,319 A | 3/1995 | Fite et al. | 369/275.5 |
| 5,450,489 A | 9/1995 | Ostrover et al. | 380/3 |
| 5,469,564 A | 11/1995 | Junya | 395/188.01 |
| 5,479,510 A * | 12/1995 | Olsen et al. | 705/17 |
| 5,490,216 A | 2/1996 | Richardon, III | 380/4 |
| 5,533,125 A | 7/1996 | Bensimon et al. | 380/4 |
| 5,553,143 A | 9/1996 | Ross et al. | 380/25 |
| 5,555,304 A * | 9/1996 | Hasebe et al. | |
| 5,563,946 A * | 10/1996 | Cooper et al. | |
| 5,590,197 A * | 12/1996 | Chen et al. | 705/65 |
| 5,629,980 A | 5/1997 | Stefik et al. | 380/4 |
| 5,634,012 A | 5/1997 | Stefik et al. | 395/239 |
| 5,638,443 A | 6/1997 | Stefik et al. | 380/4 |
| 5,682,428 A | 10/1997 | Johnson | 380/23 |
| 5,715,313 A | 2/1998 | Tsukuda et al. | 380/22 |
| 5,727,061 A | 3/1998 | Johnson et al. | 380/25 |
| 5,734,823 A | 3/1998 | Saigh et al. | 395/200.06 |
| 5,734,891 A | 3/1998 | Saigh | 395/610 |
| 5,754,649 A | 5/1998 | Ryan et al. | 380/4 |
| 5,758,068 A * | 5/1998 | Brandt et al. | 705/59 |
| 5,771,289 A * | 6/1998 | Kuzma | 380/51 |
| 5,774,545 A | 6/1998 | Raghavachari | 380/4 |
| 5,778,068 A | 7/1998 | Johnson et al. | 380/25 |
| 5,796,824 A * | 8/1998 | Hasebe et al. | |
| 5,809,143 A * | 9/1998 | Hughes | 705/77 |
| 5,809,144 A * | 9/1998 | Sirbu et al. | 705/53 |
| 5,857,021 A | 1/1999 | Kataoka et al. | 380/4 |
| 5,930,777 A * | 7/1999 | Barber | 705/17 |
| 6,047,269 A * | 4/2000 | Biffar | 705/39 |
| 6,226,618 B1 * | 5/2001 | Downs et al. | 705/1 |

\* cited by examiner

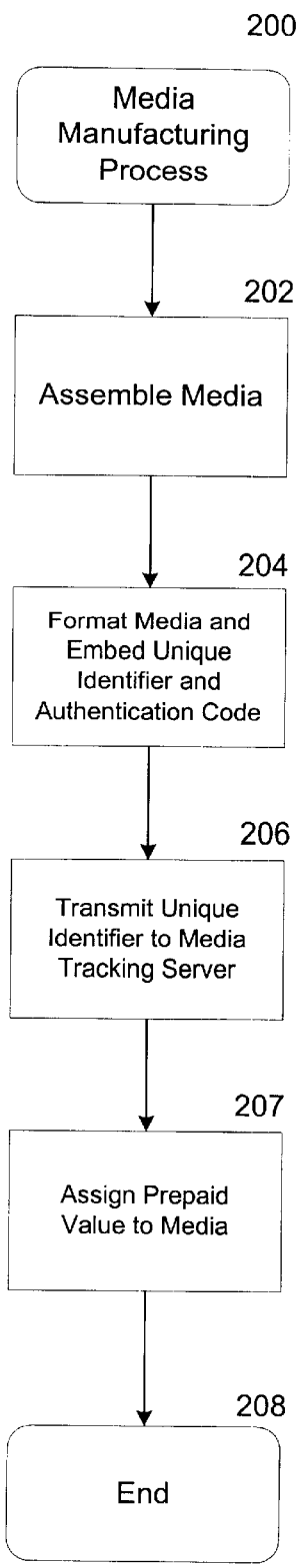
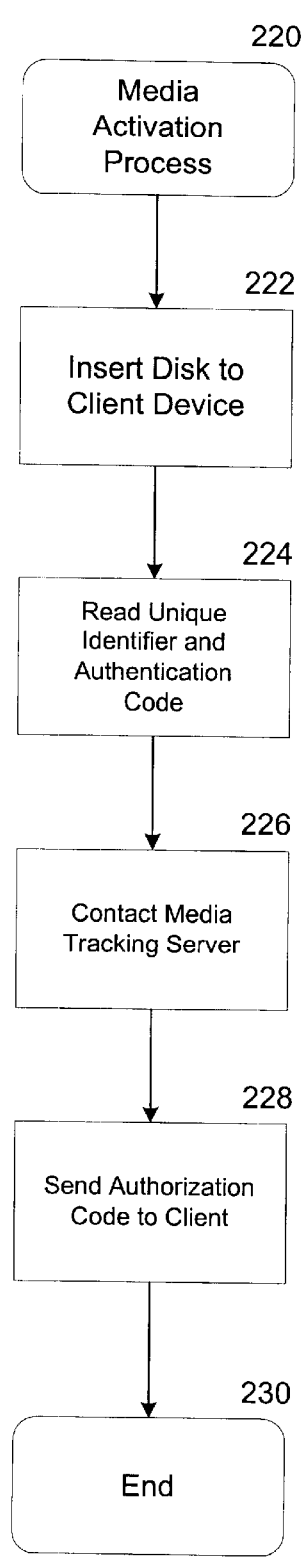
FIG. 5     FIG. 6

FIG. 10

MetaTags

1. IPMVERSION: IPM Format Version numbe specified in n.n major, minor format. Example is IPMVERSION: 0.1

2. IPMNEWFILE: This Metatag indicates a new block of Metatags and Metadata follows. Should be the first Metatag following the IPMVERSION Metatag. This Metatag is designed to allow compound IPM Files which may be used for Batch Downloads.

3. IPMFID: This Tag hold the database id for this item.

4. IPMSERVER: Specifies the IP Link to the server that contains the file to be processed. May be DNS entry or IP number. Prefer IP nimber so we don't have to relay on DNS translation.

5. IPMFILENAME: The name of the file to be processed.

6. IPMARTIST: The song artist. May be multiply name comma delimited.

7. IPMTITLE: The song title.

8. IPMALBUM: The name of the album the song is from.

9. IPMCOST: This tag contains the item's cost.

10. IPMDATE: Date file was created, or last updated. Mm/dd/yy

11. IPMSIZE: This tag contains the file size of the item.

Usage Rule
1. All Metatags are begin with the Less than sign '<' and end with colon greater htat ':>'.
2. All Metatags must begin in the first column of a line.
3. Metadata immediately follows the closing :> of the Metatag and ends with either a new Metatag or the end of file. This allows the usage of any characters or text sequence including the characters used to delimit the Metatag itself. Caveat, do not attempt to embed a Metatag inside Metadata if the embedded Metatag begins on a new line.

SYSTEM FOR PREPAYMENT OF ELECTRONIC CONTENT USING REMOVABLE MEDIA AND FOR PREVENTION OF UNAUTHORIZED COPYING OF SAME

FIELD OF THE INVENTION

The present invention relates to a system for payment of downloaded electronic content to a storage media. In particular, the present invention relates to a system wherein electronic content to be downloaded is delivered for a fee to a storage media having a predetermined prepaid value, and the fee is deducted from the predetermined value of the storage media as payment for the electronic content.

BACKGROUND OF THE INVENTION

Protection of copyrighted and other protected digitally stored data has always been a primary concern of the owners of such material. In particular, piracy of computer software, music and video has been and continues to be of great concern because it is all but impossible to stop. Although there have been many prior attempts by the software, music, and video industries to curtail piracy, each has been met with limited success.

As part of the effort to combat piracy, software vendors have licensed software rather than transferring ownership when purchased. When software is purchased, the purchaser becomes a licensed user (i.e., licensee) rather than an owner. Copying of software under most license agreements is generally limited to one copy for backup purposes only in order to legally restrict unlimited copying. In addition, the software license typically grants a right to use the software on a single computer or for use by only one user at any time.

Software vendors have also attempted to combat software piracy by copy-protecting their software. While this attempt was effective to some extent, it failed because users were unable to make backup copies. Also, soon after the first copy-protected computer software was on the market, other programs to copy the copy-protected software became available. Other copyright protection methods were then developed in an attempt to stop piracy, also with limited success. These attempts included requiring a master floppy disk to be inserted into the computer or requiring the user to enter a key or other information contained in the user manual or license agreement when executing the software from the computer's hard drive. Still others required a hardware key to be present in the computer's parallel port, which was read when the software was executed. Software vendors received a temporary reprieve when CD-ROMs became the standard media for digital storage and distribution of software, because applications grew to be so large that the only means for copying the software was to "burn" duplicates on expensive recordable CDs. However, the prices of recordable CDs and the drives to write recordable CDs have fallen dramatically and pirates can once again produce cheap illegal copies of protected software.

The music and video industries have a different concern than the software vendors. These industries are particularly concerned with pirates making perfect copies of digitally stored music and videos. While copying of music and video for non-commercial purposes is allowed, such copying has historically been performed by tape decks and video cassette recorders using analog recording techniques. Analog reproduction results in decreasing quality with every generation, whereas digital copies are exact and suffer no fidelity loss. As noted, prices of recordable CDs and the drives to write to recordable CDs have fallen dramatically and these drives can just as easily record music to the CDs as they record software and data. Further, with the advent of the Digital Versatile Disk (DVD), full length motion pictures may now be recorded to a single DVD disk. As a result, the music and video industries also have a growing need to prevent copying of digitally recorded works.

Fueling the concern of software vendors and the music and video industries is the rapid growth of the digital age and global communications. In the early 1980's when the personal computer (PC) was in its infancy and software vendors first attempted to protect their intellectual property, there were few, if any, mass distribution channels. At the same time period, the music and video industries were strictly analog at the consumer level. Thus, piracy was not a major factor as it was limited to small groups of people or organizations. However, with powerful computers on every desktop and the evolution of music and video into a digital format, piracy has become a major factor costing software vendors alone $4 billion a year worldwide. Clearly, the financial loss to software developers, musicians, actors, and their associated industries is immense.

At the root of the global communications expansion is the rapid growth of the Internet, which has pushed the piracy problem to the forefront. As is well known in the art, the term "Internet" was first used in 1982 to refer to the enormous collection of inter-connected networks that use Transmission Control Protocol/Internet Protocol (TCP/IP) protocols. Despite only gaining mass recognition over the past four years, the Internet has existed since the late 1960's and was originally designed as a Wide Area Network (WAN) that would survive a nuclear war. Throughout the 1970's and 1980's a growing number of small networks developed and connected to the Internet via gateways as a means of exchanging electronic mail. In the mid 1980's there was a significant growth in the number of available Internet hosts, and since the late 1980's, the growth of the Internet has been exponential. The growth of the Internet has provided people all over the world with a means to share and distribute information. Thus, the potential now exists for the mass distribution of pirated software, music and video on a global scale. Many Internet Usenet groups and channels on the Internet Relay Chat (IRC) are dedicated to the trading of pirated files,-music and videos. Furthering the piracy problem are groups that maintain a high profile and take a great deal of pride in their piracy accomplishments. The piracy problem has grown so large that a new term, "warez," is used to describe the pirated materials. The Internet now provides a great potential for legitimate sales and distribution of protected software, music and videos, because of its size, speed and penetration into the homes of consumers. However, these very advantages make it easy for pirates to steal expensive, proprietary software that took years to design and manufacture and within hours make it available to anyone, free for the taking.

Protecting intellectual property rights is not the only concern of the owners of such rights. Compensation for use and enjoyment of protected works is also of great concern. Lately, there has been much discussion about commerce over the Internet (so-called "E-commerce"). In particular, there has been much discussion over payment and transfer of money over the Internet because many buyers are concerned about transmitting credit card information over the Internet to a vendor that may not be reputable. Privacy is a concern as many potential customers do not want to provide personal information to vendors. Because of these concerns, many potential purchasers do not utilize the Internet for their purchases. Still further, a limitation in credit card transactions is that small transactions (e.g., those less than a dollar) are not efficient due to fees charged to sales merchants by the credit card issuers. Because of these concerns and limitations, commerce over the Internet has grown slowly.

In view of the above, there is a need for a secure method and apparatus for electronic distribution of data which will take advantage of the wide distribution of networks such as the Internet, while simultaneously preventing unauthorized and illegal copies of protected works, data and applications and provide an efficient payment mechanism. In particular, there is a need for a method and apparatus which will provide vendors of software, music and videos with a secure means of electronically distributing their works and applications over the large networks, while ensuring that their protected works and applications are not copied and pirated. Further, there is also a need for a payment system wherein small transactions are processed efficiently and consumers can be reassured that they will not be defrauded by unknown vendors and that their privacy (and anonymity) will be maintained. Such a method and apparatus would also ensure that the rights of owners of intellectual property are protected and that owners are properly compensated for their creative efforts.

SUMMARY OF THE INVENTION

In view of the above, the present invention, through one or more of its various aspects and/or embodiments is thus presented to accomplish one or more objects and advantages, such as those noted below.

In accordance with an aspect of the present invention, a method of distributing electronic content from a vendor server to a client device via a network infrastructure and for payment to a vendor of the electronic content is provided. The method utilizes a unique identifier of a piece of media to which the electronic content is stored to associate the electronic content with only the piece of media and utilizes a predetermined value of the piece of media as payment for the electronic content. The method comprises contacting the vendor server via the network infrastructure; transmitting the unique identifier of the piece of destination media to the vendor server; communicating, via the network infrastructure, information from the vendor server to a media tracking server to determine if the unique identifier is valid and to determine a remaining balance of the predetermined value of the piece of media; communicating, via the network infrastructure, the electronic content to the piece of media, wherein the electronic content is in an encrypted format; and writing the electronic content to the piece of media such that the electronic content may be accessed for use from only the piece of media.

According to a feature of the invention, the step of communicating, via the network infrastructure, information from the vendor server to a media tracking server, further comprises determining if the remaining balance is greater than a purchase price of the electronic content; deducting the purchase price from the remaining balance to determine a new remaining balance if the remaining balance is greater than a purchase price of the electronic content; and sending an acknowledgment to the vendor server prior to communicating the electronic content to the piece of media. The method may further comprise crediting an account of the vendor of the electronic content. In addition, the method may further comprise notifying the vendor server that the remaining balance is insufficient to cover the cost of the electronic content if the remaining balance is less than a purchase price of the electronic content; notifying the client device that the remaining balance is insufficient to cover the cost of the electronic content; requesting if the remaining balance is to be replenished; and obtaining payment information to replenish the remaining balance.

According to another feature, the step of communicating, via the network infrastructure, the electronic content to the piece of media, wherein the electronic content is in an encrypted format; further comprises determining if an error situation has occurred during the communication of the electronic data; determining if the piece of media is full; and if so, prompting a user to insert a second piece of media having a second predetermined value and downloading the electronic content to the second piece of media. The method may also include reading a second unique identifier from the second piece of media; determining, at the media tracking server, if the second piece of media is valid based on the second unique identifier; and transferring the remaining balance from the piece of media to the second piece of media.

According to yet another feature, the step of transmitting the unique identifier to the vendor server further comprises accessing the one piece of destination media; reading the unique identifier from a predetermined location on the one piece of destination media; and formatting the unique identifier into a first data structure for communication to the vendor server. The predetermined location on the one piece of destination media may be a predetermined track.

According to a further feature, the step of communicating the electronic content to the piece of media, wherein the electronic content is in an encrypted format comprises encrypting at least one of the electronic content and an encryption key to the electronic content, the encrypting using the unique identifier as an encryption key. The electronic content is written to the one piece of media in an encrypted format using the unique identifier as a decryption key.

According to still another features, contacting the vendor server via the network infrastructure comprises submitting, from the client device, a form to the vendor server; executing, at the vendor server, a program to process the form; and sending, to the client device, a metatag and transaction file. The metatag and the transaction file launch a client program at the client device after being sent to the client device, and wherein the client program opens the transaction file and parses metadata from metatags within the transaction file. The client may connect to a server address identified by a predetermined metatag in the transaction file to receive the electronic content. Also, the server address may be dynamically changed as the electronic content is requested from the vendor server.

According to a feature of the invention, the step of transmitting the unique identifier to the vendor server further comprises accessing the one piece of destination media; reading the unique identifier from a predetermined location on the one piece of destination media; obtaining vender information; obtaining user information; building a compound key through a predetermined operation using the unique identifier, the vendor information, and the user information; and formatting the compound key into a first data structure for communication to the vendor server with the unique identifier.

According to yet another feature, the step of communicating the electronic content to the piece of media, wherein the electronic content is in an encrypted format comprises encrypting at least one of the electronic content and an encryption key to the electronic content, the encrypting using the compound key as an encryption key. The electronic content may be written to the one piece of destination media in an encrypted format using the compound key as a decryption key.

According to another aspect of the invention, a system for distribution of electronic content over a network infrastructure to a client device running an application program is provided. The client device includes a piece of media having a unique identifier and a prepaid monetary value inserted therein, and the system further compensates a vendor of the electronic content from a remaining balance of the prepaid monetary value. The system comprises a vendor server containing the electronic content and offering the electronic content for downloading to the client device via the network infrastructure, and a media tracking server that maintains the remaining balance of the piece of media in accordance with the unique identifier. The unique identifier is communicated to the vendor server and the vendor server communicates the unique identifier to the media tracking server to determine the remaining balance, and the vendor server encrypts the electronic content and downloads the encrypted electronic content to the piece of media such that the electronic content may only be accessed from the piece of media.

According to a feature of the invention, the media tracking server determines if the remaining balance is greater than a purchase price of the electronic content, the media tracking server debits the purchase price from the remaining balance to determine a new remaining balance if the remaining balance is greater than a purchase price of the electronic content, and the media tracking server sends an acknowledgment to the vendor server prior to communicating the electronic content to the piece of media.

According to another feature, the media tracking server credits an account of the vendor of the electronic content.

According to a further feature, the media tracking server notifies the vendor that the remaining balance is insufficient to cover the cost of the electronic content if the remaining balance is greater than a purchase price of the electronic content, and the vendor server requests if the remaining balance is to be replenished and payment information to replenish the remaining balance is communicated via the application software to the media tracking server.

According to yet another feature, the vendor server determines if an error situation has occurred during the communication of the electronic data and determines if the piece of media is full, and if the media is full, the application software requests that a second piece of media having a second predetermined value be inserted into the client device, and the vendor server resumes downloading the electronic content to the second piece of media.

According to still another feature, the application software reads a second unique identifier from the second piece of media, and the media tracking server determines if the second piece of media is valid based on the second unique identifier and transfers the remaining balance from the piece of media to the second piece of media.

According to a feature of the invention, the application software accesses the one piece of destination media and reads the unique identifier from a predetermined location on the one piece of destination media, and the application software formats the unique identifier into a first data structure for communication to the vendor server.

According to yet another feature of the invention, the predetermined location on the piece of media is a predetermined track.

According to still another feature, the electronic content to be transmitted to the client device is encrypted using the unique identifier as an encryption key. The electronic content may be written to the piece of media in an encrypted format using the unique identifier as a decryption key.

According to a further feature, the application software accesses the piece of destination media and reads the unique identifier from a predetermined location on the piece of destination media, obtains vender information, and obtains user information. The application software builds a compound key through a predetermined operation using the unique identifier, the vendor information, and the user information, and the application software formats the compound key into a first data structure for communication to the server with the unique identifier.

According to yet another feature, the electronic content to be transmitted is encrypted using the compound key as an encryption key. The electronic content is written to the piece of destination media in an encrypted format using the compound key as a decryption key.

According to yet another aspect of the present invention, a media tracking server for use in a system for downloading electronic content from a vendor server to a client device over a network infrastructure is provided. The client device includes an application program and has a piece of media having a unique identifier and a prepaid monetary value inserted therein. The media tracking server comprises a processor which controls the media tracking server in accordance with instructions from an application program, a database, and a communication interface to the network infrastructure. The media tracking server maintains a remaining balance that is associated with the unique identifier in the database.

According to a feature of the invention, the media tracking server is adapted to receive information from a manufacturer of the piece of media, the information comprising the unique identifier.

According to a further feature, the manufacturer further communicates the prepaid monetary value to the media tracking server, and wherein the media tracking server associates the prepaid monetary value to the unique identifier in the database. Alternatively, the media tracking server mat determine the prepaid monetary value and communicate the prepaid monetary value to the manufacturer.

According to still another feature, the media tracking server is adapted to receive information from a vendor server, the information comprising a request to determine a remaining balance of the piece of media based on the unique identifier by forwarding a cost of electronic content to be purchased. The media tracking server may debit the remaining balance of the unique identifier and credit an account of the vendor in the amount of the cost of the electronic content to be downloaded.

Other features of the invention are described below.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like reference numerals represent similar parts throughout the several views of the drawings, it being understood, however, that the invention is not limited to the specific methods and instrumentalities disclosed. In the drawings:

FIG. 5 is a flow chart illustrating an overview of the processes performed during the manufacturing of a prepaid media disk in accordance with the present invention;

FIG. 6 is a flow chart of the processes performed during a media activation process;

FIG. 10 is an exemplary format of a file containing parameters that are passed to a client program which controls a data download process of FIG. 7.

DETAILED DESCRIPTION OF THE PREFERRED EMBODIMENTS

I. Overview

Figure 1:
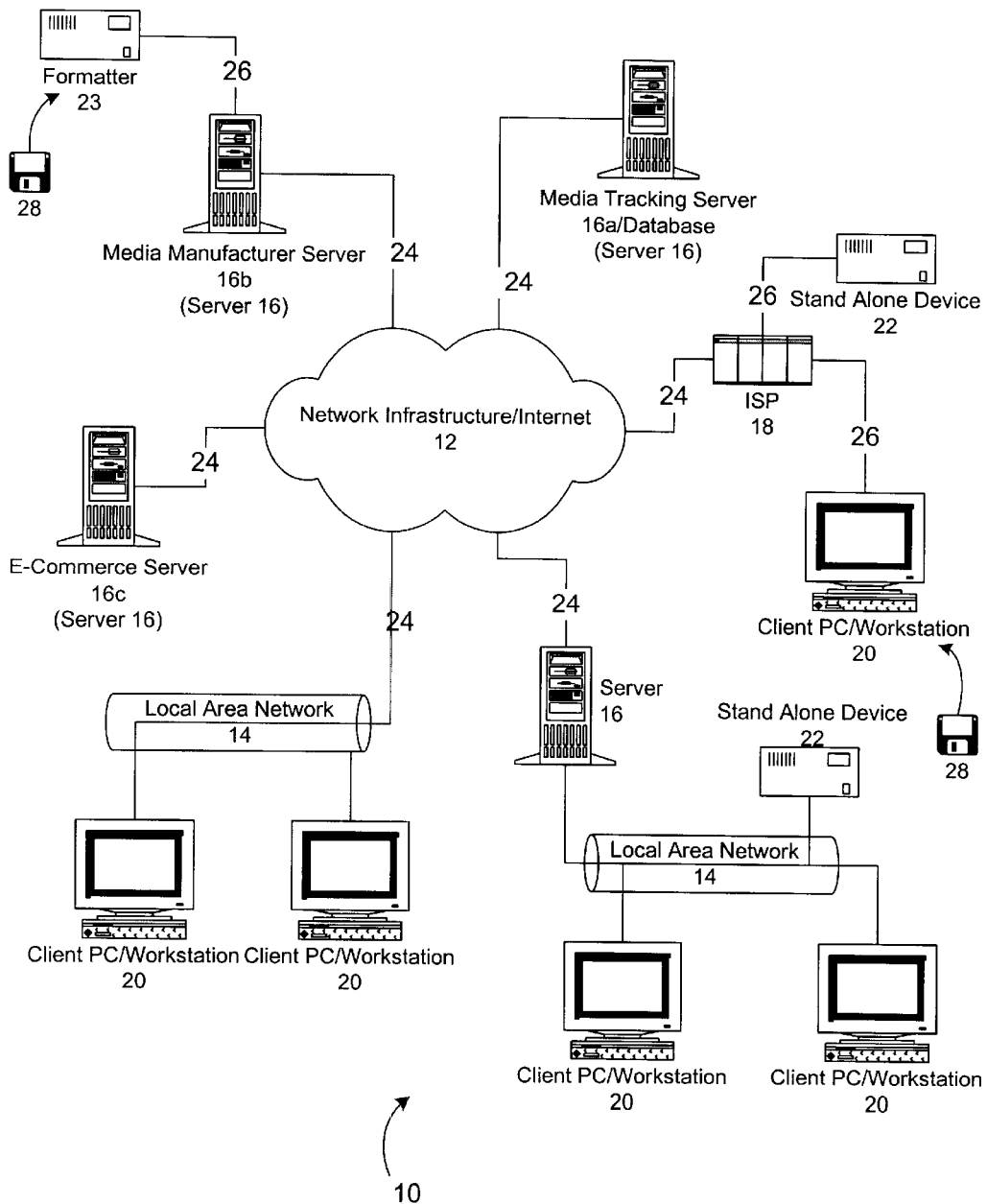
FIG. 1 is an exemplary computer network environment in which the present invention may be implemented.

The present invention provides for a secure method of transmitting electronic data (content) from a remote server 16 to a removable storage media 28 having a predetermined value associated therewith and for preventing the unauthorized distribution and copying of the data once it has been delivered to the media 28. As used herein, the term "data" includes all information that may be stored on a storage media, including but not limited to, executable files, linked library files, data files, database files, audio files, and video files. As illustrated in FIG. 1, and as will be described herein below, several entities provide these features. These entities include: a tracking entity having a media tracking servers 16a, a media manufacturer(s) having a media formatter 23 and media manufacturer servers 16b, and vendors having electronic commerce or vendor servers 16c ("E-commerce" server).

In accordance with the present invention, users (customers) purchase the removable media 28 for an amount that includes the price of the media 28 and an additional prepayment amount (e.g., $5, $10, $20, $50, or other) which may be used for purchasing and downloading of electronic content over the network infrastructure 12. The media 28 includes a unique identifier that is embedded on the media 28 such that it cannot be altered or copied. As customers select and download electronic content from vendors' servers 16c, the purchase price of such electronic content is deducted from the remaining balance of the media 28, which is associated to the media by the unique identifier by a tracking server 16a that maintains the balance for each unique identifier in a database. As will be described in detail below, the content is downloaded in an encrypted format to the media 28 using at least the unique identifier of the media 28 as an encryption key in order to prevent additional unauthorized copies from being made. Such a system provides a convenient mechanism for purchases of electronic content without the necessity of transmitting personal information or credit card numbers to the vendors. Further, the system of the present invention prevents unauthorized copying of the electronic content, as the content may only be accessed from the same piece of media 28 to which the content was downloaded because the encryption of the data will render the content unusable from other media 28 having a different or no unique identifier.

II. Exemplary Network Structure and Hardware of the Preferred Embodiments

Figure 2:
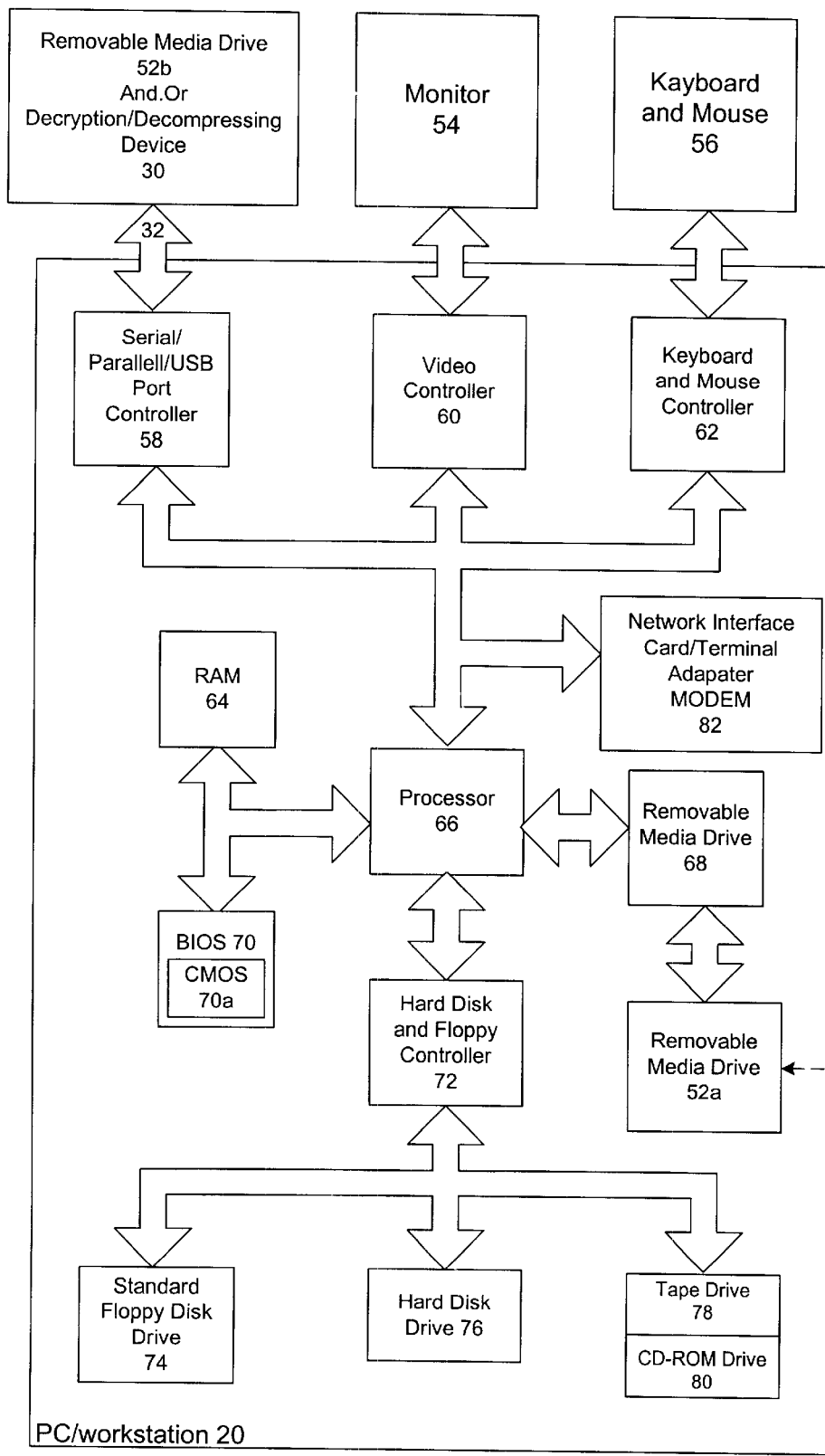
FIG. 2 is a block diagram of the components of a client PC/Workstation shown in FIG. 1.
Figure 3:
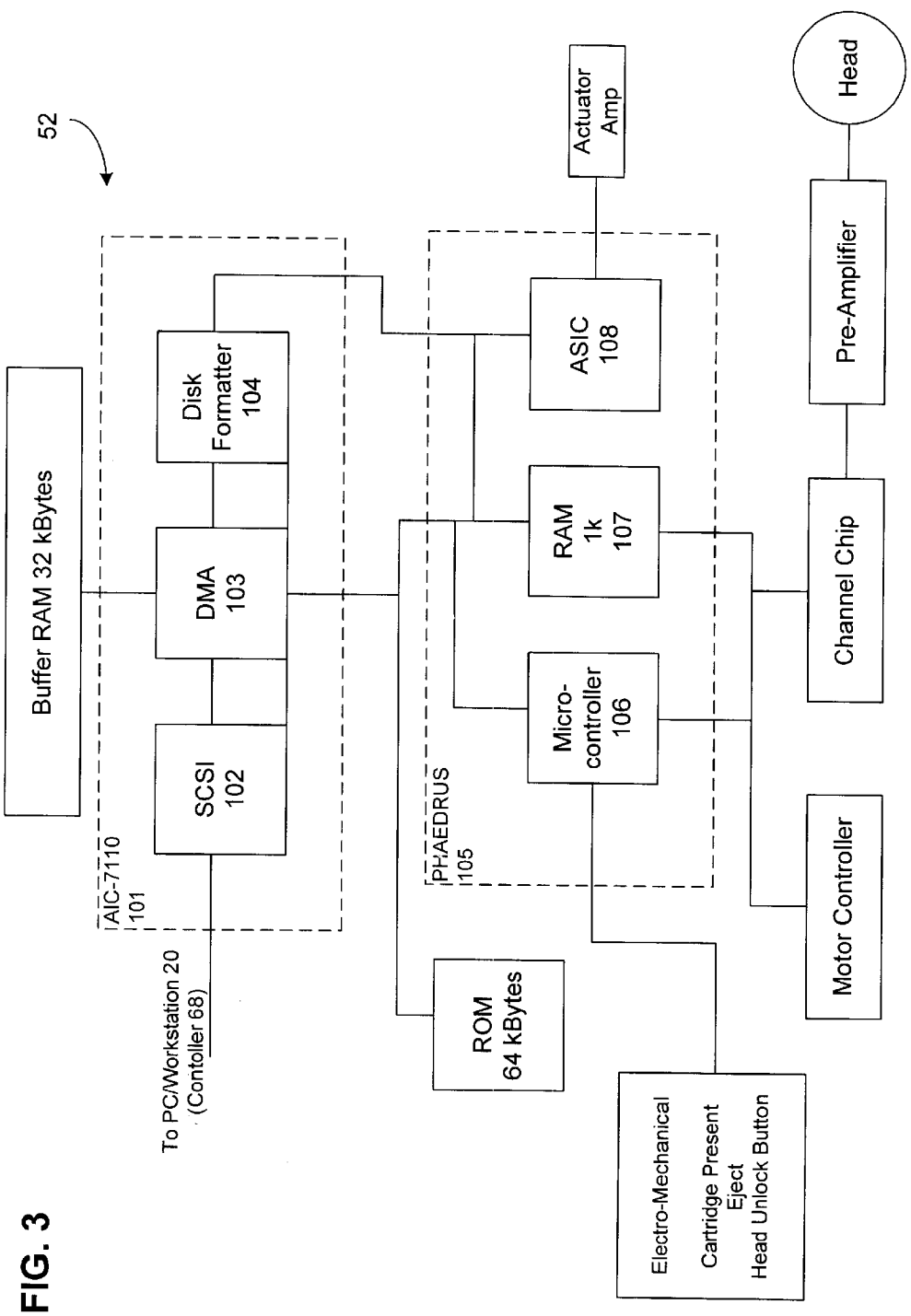
FIG. 3 is a block diagram of the components of a preferred media drive shown in FIG. 2.

Referring now to FIGS. 1–3, there is illustrated an exemplary, non-limiting, environment 10 and devices in which the present invention may be implemented. As shown in FIG. 1, the environment 10 includes a Wide Area Network (WAN) infrastructure 12. The WAN infrastructure 12 may comprise a Transmission Control Protocol/Internet Protocol (TCP/IP) network such as the Internet. Attached to the WAN infrastructure 12, via communications lines 24, may be one or more Local Area Networks (LAN) 14, servers 16, Internet Service Providers 18 and stand alone devices 22 that are compatible with the protocols of the WAN infrastructure 12. As illustrated, the LAN 14 and ISP 18 may have attached thereto client PC/workstations 20 that may access the network infrastructure 12 via the LAN 14 or ISP 18, and that are capable of at least accessing and reading data on a removable media 28.

The LAN 14 may comprise an Ethernet or Token Ring network and have a server 16 and gateway (not shown) that provides a connection to the network infrastructure 12 via one or more communications links 24. The communication links 24 to the remote systems may be wireless links, satellite links, or dedicated lines.

The servers 16 may comprise, for example, UNIX-based or Windows NT Server-based computer platform having one or more processors (e.g., Intel Pentium II processor, Digital Equipment Company Alpha RISC processor, or Sun SPARC Processor), long-term storage (e.g., a RAID disk array), random access memory (RAM), communication peripherals (e.g., network interface card, modem, and/or terminal adapter), and application programs (e.g., database software applications, World Wide Web publishing/hosting software, and inventory management software) which may be used to distribute information to the client PC/workstations 20 and other servers 16. The servers 16 may be configured as, for example, World Wide Web (WWW) servers, File Transfer Protocol (FTP) servers, electronic mail (E-mail) servers, etc. The ISP 18 typically is an organization or service that provides access to the Internet (network infrastructure 12) via a server (not shown) connected to the Internet by communications link 24. In exemplary embodiment of FIG. 1, the client PC 20 may utilize a dial-up connection 26 (via the public switched telephone network) to connect to the ISP 18.

The client PCs 20 may comprise Windows 9x or Windows NT Workstation-based personal computers having an Intel Pentium processor or higher, long-term storage (e.g., a IDE or SCSI hard disk), a removable media drive (e.g., CD-R, DVD, or other removable floppy or hard disk drive), random access memory (RAM), communication peripherals (e.g., network interface card, modem, and/or terminal adapter), and suitable application programs (e.g., Dial-up networking software and a Web Browser). If configured as a workstation, the workstations 20 may comprise, for example, UNIX-based IBM RS/6000 or SUN SPARCStation workstations. Further, the client PC/workstations 20 may comprise the so-called "network computing" devices.

A block diagram of an exemplary PC/Workstation 20 is illustrated in FIG. 2. As shown, the PC/Workstation 20 is divided between internal and external components. The internal components include a Basic Input/Output System (BIOS) 70 and a processor (CPU) 66 that control the overall functioning of the PC/Workstation 20. Memory 64, a hard disk drive 76, a floppy disk drive 74, a tape drive 78, a CD-ROM drive 80, a MODEM/Terminal Adaptor/Network Interface Card 82, and a removable media drive 52a are also connected to the CPU 66. The removable media drive 52a or 52b operates to read and/or write to a storage media contained within a removable storage cartridge 28. The exemplary PC/workstation 20 of FIG. 2 is configured with two removable media drives 52a and 52bto emphasize that a removable media drive can be implemented in either internal or external form.

The MODEM/Terminal Adaptor/Network Interface Card 82 may comprise individual cards performing communications-related functions, as known in the art. The MODEM/Terminal Adaptor/Network Interface Cards 82 are included within PC/workstation 20 to provide communications to external networks to which the PC/workstation 20 is connected. In particular, the MODEM/Terminal Adaptor/Network Interface Card 82 may be used to access LAN 14, ISP 18 and network infrastructure 12.

Communications between internal and external devices may be accomplished via controllers provided within the PC/workstation 20. A serial/parallel/USB port controller (which may comprise separate controllers) 58, a monitor controller (video card) 60, and a keyboard and mouse controller 62 each provide an interface between the CPU 66 and an external removable media drive 52b (or printer), monitor 54, and keyboard and mouse device 56, respectively. A hard disk and floppy disk controller 72 serves as an interface between the CPU 66 and the hard disk 76 and the CD-ROM drive 80, and the floppy disk 74 and tape drive 78, respectively. It will be appreciated by those skilled in the art that the disk controller 72 may comprise separate floppy and hard disk controllers (e.g., IDE or SCSI controller).

A removable media controller 68 serves as an interface between the removable media drive 52a and the CPU 66. For example, the removable disk controller 68 may comprise a Small Computer System Interface (SCSI) or Integrated Drive Electronics (IDE) interface controller. A hard disk and floppy disk controller 72 serves as an interface between the CPU 66 and the hard disk 76 and the CD-ROM drive 80, and the floppy disk 74 and tape drive 78, respectively. Alternatively, the removable media drive 52a may utilize the disk controller 72 as an interface to the CPU 66.

Referring now to FIG. 3, there is illustrated a block diagram of an exemplary media drive 52 having a SCSI interface to the PC/workstation 20 (via controller 68). The media drive 52 preferably comprises, a ZIP® drive, manufactured by Iomega Corporation, Roy, Utah; however, other media drives may be used as media drive 52. The media drive 52 includes components that provide for communication between the read/write channel for the media (lower right side of diagram) and the PC/workstation 20 (upper left side of diagram). The media drive 52 includes an AIC chip 101 which performs the SCSI 102, the direct memory access (DMA) 103, and disk formatter 104 functions. The interface also includes a PHAEDRUS 105 which includes an 8032 microcontroller 106, a 1 kByte RAM 107 and an application specific integrated circuit (ASIC) 108. The ASIC 108 may perform various functions, such as servo sequencing, data splitting, EOC, ENDEC, A-to-D, and D-to-A conversion. The communication between the media drive 52 and the PC/workstation 20 is accomplished through transfers of data between the input/output channel of the media drive 52 and the media controller 68 (e.g., SCSI controller) of the PC/workstation 20.

Referring again to FIG. 1, the stand alone devices 22, as used herein, may encompass any device capable of interacting with the network infrastructure 12, other than the "traditional" computing device (i.e., PCs, workstations, network computers, or terminals). For example, the stand alone device 22 may include devices such as WebTV®, available from WebTV Networks, Palo Alto, Calif., a music or video player, etc. Further, the stand alone device 22 may include a special purpose kiosks provided for customers to make purchases using the system of the present invention. The kiosks may be conveniently located at shopping malls, grocery stores, libraries, book stores, etc. It is also noted that the stand alone device need not be provided with a communications connection to the network infrastructure, LAN, or ISP.

Figure 4:
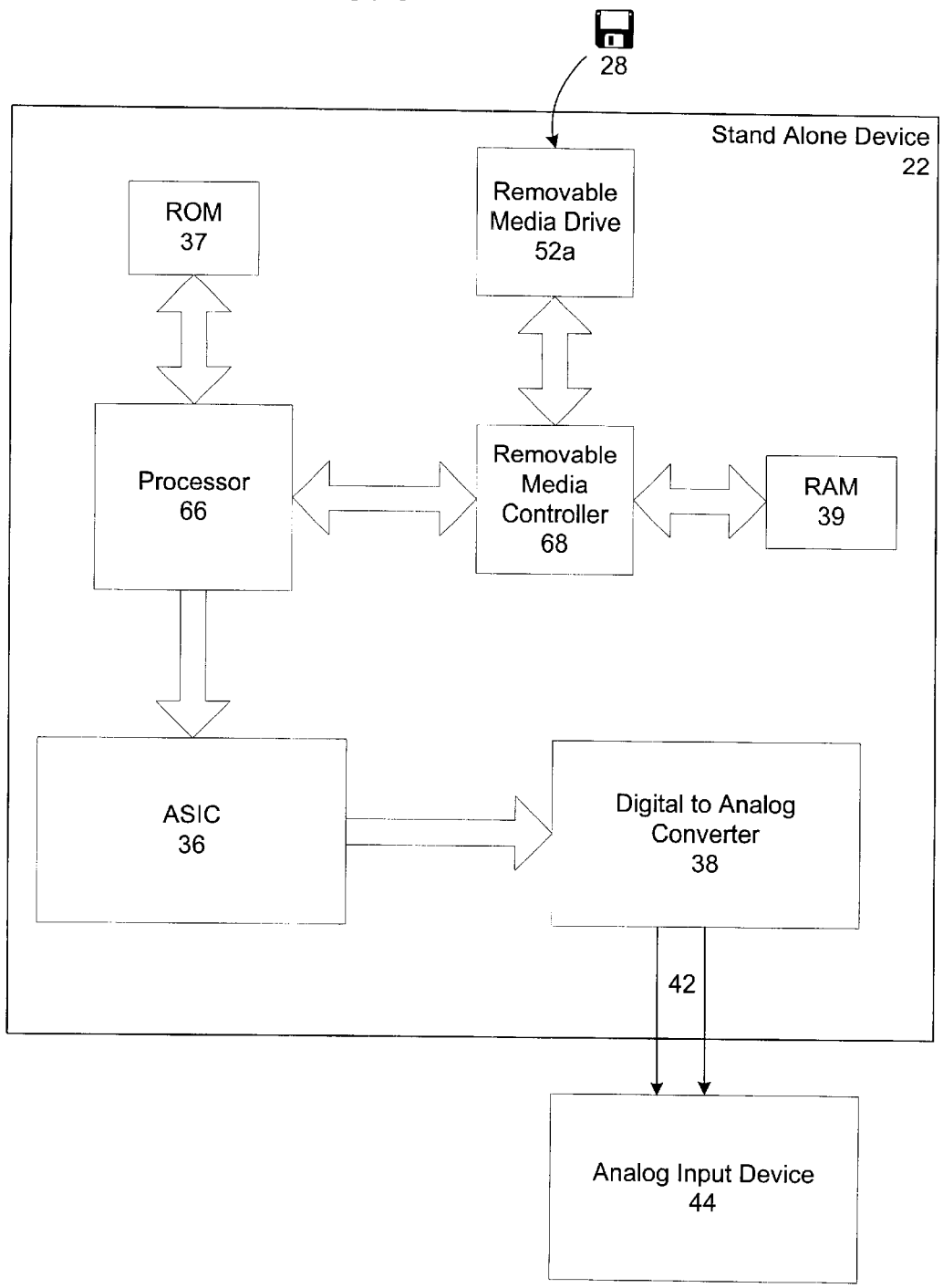
FIG. 4 is a block diagram of the components of an exemplary stand alone device shown in FIG. 1.

A block diagram of an exemplary stand alone device 22 is illustrated in FIG. 4. The exemplary stand alone device 22 includes a removable media drive 52a, a removable media controller 68, a CPU 66, an ASIC/controller 36, a digital to analog converter 38, ROM 37, and RAM 39. As can be appreciated by one of skill in the art, the stand alone device 22 of FIG. 4 may operate as a "player" or "viewer" of the protected data by reading the protected data from the media 28. Further, the stand alone device 22 may operate only to receive content from the network infrastructure 12, in the case of the kiosk mentioned above. The removable media drive 52a, the removable media controller 68, and CPU 66 each operate as described in the PC/Workstation 20 of FIGS. 1–3. ROM 37 contains instructions to control the operation and functions of the stand alone device 22. The ASIC/controller 36 may be used decrypt the protected data and output digital audio and/or video signals (e.g., Pulse Code Modulation (PCM)) to the digital to analog converter 38 for conversion to analog audio or video signals.

It is noted that the exemplary environment and devices shown in FIGS. 1–4 are not limited to the illustrated environment, as other network infrastructures, communications connectivities, and devices are intended to be within the scope and spirit of the present invention.

III. Operation of the Preferred Embodiments

A. Media Manufacturing Process

As will become evident to those of skill in the art, the features and aspects of the present invention may be implemented by any suitable combination of hardware, software and/or firmware. Referring now to FIG. 5, there is illustrated the process by which the media 28 is manufactured and the unique identifier and prepaid balance is established. The process begins at step 200 and the media 28 is assembled by the manufacturer at step 202 to construct the removable media disk 28. At step 204, the media is formatted using formatter 23 which formats the media 28 for use on the PC 20 and/or stand alone device 22 and also embeds the unique identifier (e.g., serial number) and an authentication code onto the media. The authentication code prevents hacking of serial numbers in that forging a serial number would statistically require $2^{64}$ attempts if the authentication code is a 64-bit number.

By way of a non-limiting example, the media 28 may comprise a ZIP® disk manufactured by Iomega Corporation, Roy, Utah. Each Iomega ZIP® disk contains a unique serial number that is written to a predetermined track during the formatting process which may be used as the unique identifier. The serial number is preferably created by but not limited to a pseudo random number generator. Further, while the media 28 has been described in terms of a ZIP® disk, it is not limited to the ZIP® disk, as the use of other removable media types having a unique serial number is within the scope and spirit of the present invention such as CD-R, DVD-RAM, and other removable floppy and hard disks. Further, it is not necessary for the assembly step (step 202) to occur contemporaneously with the formatting step (step 204). Nor do both steps need to be performed by the same manufacturing entity. In the case of the Iomega ZIP® disk, the formatter 23 may comprise a PC 20 having multiple standard ZIP® drives connected thereto. The formatter 23 ZIP® drives include firmware that allows writing of the unique serial number to a predetermined track that is not accessible by a standard ZIP® drive.

At step 206, the unique identifier and authentication code embedded onto the media are transmitted to the media tracking server 16*a* via e.g., TCP/IP sockets to an IP address of the media tracking server 16*a* in a predetermined data structure. Such a data structure may be as follows:

struct SocketCommand
    {
      unsigned long Code;
      unsigned long Size;
      unsigned char Data[400];
    };

The media tracking server 16*a* then stores the unique identifier and authentication code in a database. The database may include a relational database management program such as Oracle. At step 207, the prepaid value is determined, and in accordance with the invention may be established by the manufacturer or the tracking entity. For example, if the manufacturer sets the prepaid value, the value may be transmitted in the same data structure with the unique identifier and authentication code. The media tracking server 16*a* then parses the unique identifier, authentication code and predetermined value before entering them into the tracking database. If the media tracking server 16*a* sets the prepaid value, then the tracking server 16*a* sends a response back to the manufacturer server 16*b* containing the prepaid value such that the media 28 may be properly labeled for sale.

At step 208 the process ends and the media 28 is ready for distribution to points of purchase for sale to end consumers.

B. Activation of the Media

In accordance with the present invention, the media tracking server 16*a* maintains a current balance for each piece of media 28. In order to activate that a particular piece of media 28, users preferably register the media 28 with the media tracking server 16*a* prior to the first use of the media 28 (i.e., prior to the first time the media 28 is used to receive electronic content). This also serves the purpose of ensuring that the unique identifier is registered only once in order to prevent fraud. That is, activating the media prevents fraud by eliminating the possibility of two (or more) pieces of media having the same unique identifier 28 in an attempt to fraudulently obtain a greater prepayment amount than originally purchased. Further, registering the media 28 prevents fraud through the possibility that the application software is illegally modified such that it reports a different serial number and authentication code.

Referring to FIG. 6, there is illustrated the process of activating the media 28 for use by consumers. The process begins a step 220 where the user inserts the prepaid media 28 into the media drive 52 (step 222). An application running on the PC 20 (or stand alone device 22) reads the unique identifier and authentication code (step 224). This is performed by querying the media using an application programming interface (API) such as the Iomega Ready API, or other suitable method.

The Iomega Ready API when invoked causes the media drive to read the unique serial number from the predetermined track by using the SCSI 0x06 Non-Sense Command. In particular, by invoking the Disk Status Page (page 0x02) of the Non-Sense Command, the media serial number may be determined by reading offset bytes 20–59 of the returned data structure. Exemplary source code for performing step 302 in conjunction with an Iomega ZIP® drive and disk is as follows:

```
void CClientApp::GetZipDrive( )
{
    int j,k;
    m_DriveNum = 0;
    for(j = 0;j < 26;j++)
        // scan the drives and find the IOMEGA drives
    {
        if(IsIomegaDrive(j) )
        {
            k = GetGeneralDevType(j);
            if( k == DRIVE_IS_ZIP )
            {
                m_DriveNum = j;
                j = 26;
            }
        }
    }
}
void CClientApp::GetSerialNumber( )
{
    unsigned char szBuffer[1024];
    memset(szBuffer,0,sizeof(szBuffer));
    memset(&m_SerialNumber,0,40);
    GetInfoNonSense(m_DriveNum,0x02,szBuffer);
    memcpy(&m_SerialNumber,&szBuffer[22],39);
}
```

It can be appreciated that the unique serial number is not limited to information stored on the media 28, such as the serial number, and that other types of information could be used as the unique identifier. In addition, the unique serial number should contain a sufficient number of bits (length) to ensure that no two pieces of media have the same identifier. For example, each Iomega ZIP® disk contains a unique 39 byte (312 bits) serial number, and other bit lengths may be utilized.

Alternatively, at step 224 the software may collect additional information from the user, such as name, address, telephone number, e-mail address, etc. together with the unique identifier, which may be transmitted to register the media 28 if requested by the tracking entity.

At step 226, the application software then contacts the media tracking server 16*a* at the IP address of the server 16*a* using, e.g., TCP/IP sockets, and communicates the unique identifier via an appropriate data structure, such as that noted above with regard to step 206. The media tracking server then looks-up the unique identifier to determine if the unique identifier is valid (i.e., has been formatted to a piece of media 28 by the manufacturer), and if the unique identifier has not been previously activated. If both conditions are satisfied, the media tracking server returns an affirmative confirmation to the PC 20 at step 228. The consumer is provided with a confirmation prompt and the application software may then utilize the media 28 for purchase and download of electronic content. However, if it is determined by the media tracking server 16*a* that the unique identifier has already been activated, or that the unique identifier is invalid, the media tracking server 16a returns a negative confirmation to the application software on the PC 20. Accordingly, the application software will reject the media 28, and, preferably, provide the user with a prompt that the media is invalid and that the user should contact technical support and/or the point of purchase. At step 230 the activation process ends.

C. Customer Purchases Using Prepaid Media

In accordance with the present invention, the network server or servers 16 may store data, such as application software, database tables, music, video, etc. for distribution to clients and/or stand alone devices 22. The present invention, while applicable to all types of data transfer, is especially applicable to commerce over the Internet, and in particular, to electronic distribution and delivery of software, music and video data.

Figure 7:
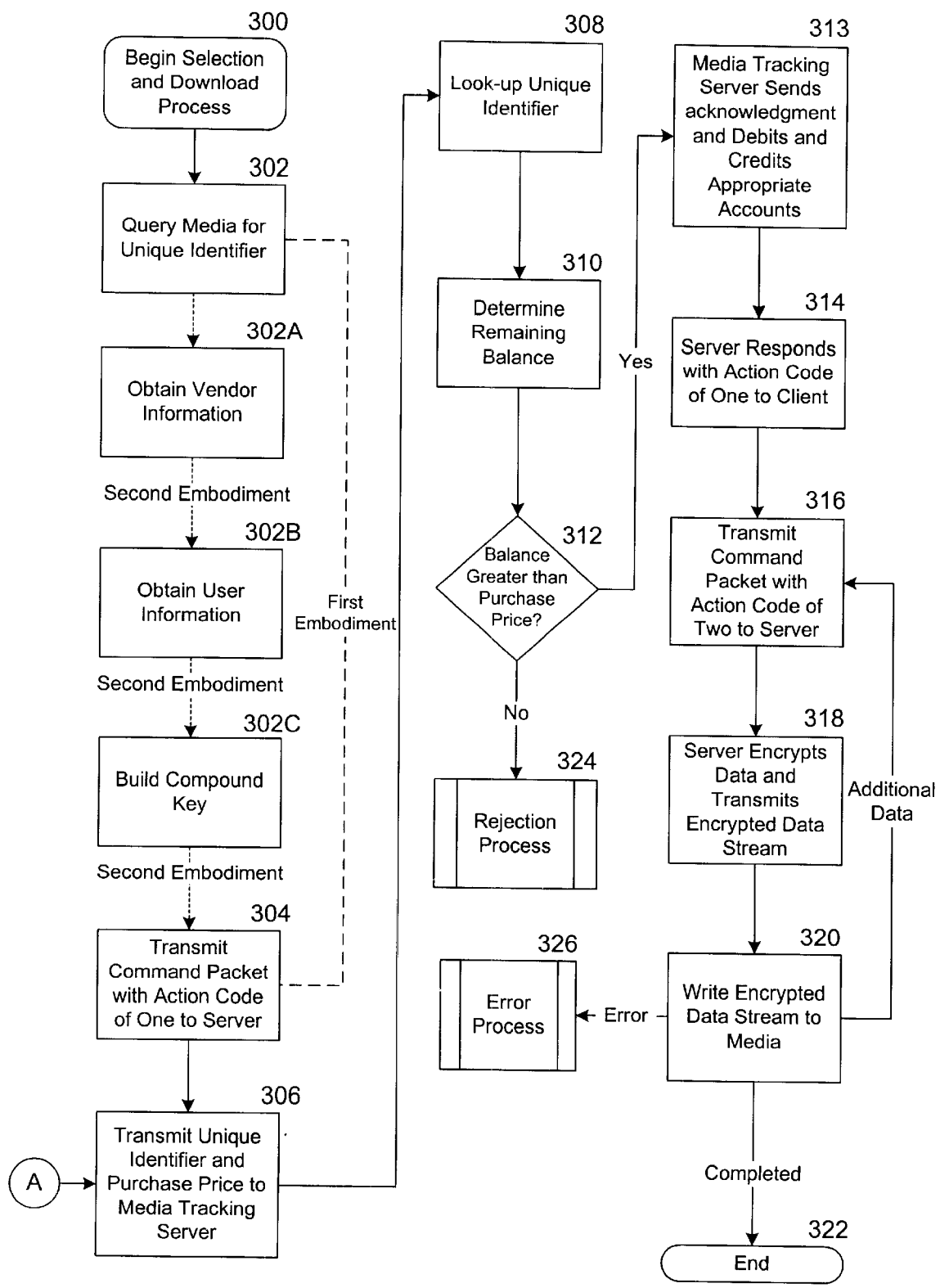
FIG. 7 is a flow chart of the processes performed during a user selection and download process.

Referring now to FIG. 7, there is illustrated the process by which a customer selects and downloads electronic content using the prepaid media 28 of the present invention. The user initiates the electronic data distribution process at step 300 when he or she desires to purchase software, music or videos (i.e., protected electronic data) using a home personal computer 20 or stand alone device 22. The stand alone 22 may include that which is illustrated in FIG. 4.

The protected electronic data may be offered for sale for a fee from e.g., a World Wide Web (WWW) site (a so-called "E-commerce" site) residing on, e.g., an E-commerce server 16c, and purchased using a credit card, debit card, smart card, virtual cash, etc. in addition to the prepaid media. To this end, the home user may connect to the E-commerce server 16c via an Internet browser such as Netscape Navigator or Internet Explorer by entering the universal resource locator (URL) or "clicking" a hyper-text link that contains the E-commerce site's URL. The URL may contain, e.g., an Internet Protocol (IP) address (e.g., 147.178.20.151) or a domain name (e.g., "sitename.com") that identifies the IP address of the server 16c such that the browser may establish a TCP/IP connection. Once connected, the user makes a selection of protected electronic data to be downloaded to his or her PC 20 in accordance with the E-commerce site's WWW site design.

After the user clicks on the download button of the displayed web page from the E-commerce server 16c, this action causes the PC/workstation to submit an HTML form to the E-commerce server 16c. The web server 16c then executes the appropriate Common Gateway Interface (CGI) program. The CGI program running on the Iomega store web server 16 sends the metatag "Content-Type: application/x-ipm" followed by an appropriate Iomega Prepaid Media File (IPM) to the client PC/workstation 20. The IPM file is unique to the E-commerce server 16c and is used to provide information to an IPM client program which controls the download process at the client side (at the PC 20). The format of an exemplary IPM file for use in downloading a music file is shown in FIG. 10. It is noted that the IPM file may take other formats as necessary depending on the electronic content and requirements of the various entities involved in the transaction. As the web browser receives the metatag, it launches the IPM client program and passes the IPM file name as a command line parameter. The IPM client application opens the IPM file and parses the metadata from the metatags. The client PC/workstation 20 will connect to the server address provide by the IPM-SERVER tag to receive the electronic data (see, step 308). The server address may be dynamically changed for each request in order to balance the load on the server. For example, the IPM file may include the following information for a transfer of a single file containing a song:

<IPMVERSION:>0.1
<IPMNEWFILE:>
<IPMID:>2
<IPMSERVER:>147.178.20.151
<IPMFILENAME:>D:\WebSite\htdocs\html\ZipMan\Samples\SolsHill.mp3
<IPMARTIST:>Peter Gabriel
<IPMTITLE:>Solsbury Hill
<IPMALBUM:>Peter Gabriel
<IPMCOST:>$2.50
<IPMDATE:>May 4, 1998
<IPMSIZE:>4746500

At step 302 the client PC 20 queries the particular piece of media 28 to which the downloaded content is to be stored for the media's unique serial number. This may be performed using an application programming interface (API) such as the above-noted Iomega Ready API, or other suitable method.

Two alternative embodiments for the selection/download process are contemplated in accordance with the present invention. As will be described in detail below, in accordance with one embodiment of the present invention, the electronic data is encrypted during the download process to the media 28 using only the unique identifier (e.g., serial number) of the media 28 as an encryption key. The encrypted protected electronic data is then associated to the media 28 by the unique identifier and may not be accessed from any other media having a different or no unique identifier.

According to the second embodiment of the present invention, the electronic data is encrypted during the download process to the media 28 using the unique identifier of the media 28, a vendor identifier and a user identifier as an encryption key. Such an encryption/decryption key will be identified herein as a "compound key." The encrypted protected electronic data is then associated to the media 28 by the compound key and may not be accessed from any other media. Thus, according to both embodiments, any protected electronic data that is copied from the destination media 28 to other storage devices will be unusable, as the other storage devices will at least not have the same unique identifier as the destination media 28. Such a system prevents unauthorized copying of the protected electronic data, protecting the intellectual property rights of the seller or owner of such rights. It is noted that other implementations are within the scope of the present invention, so long as the data written to the media 28 is protected from unauthorized copying.

The first embodiment proceeds from step 302 directly to step 304 (described below), however, the second embodiment performs additional steps by obtaining the necessary additional information to generate the compound key. As noted, the second embodiment provides for additional security by including not only the unique serial number in the encryption/decryption key, but also the vendor identifier and the user identifier. In particular, by using the compound key having vendor information and user information, certain additional safeguards may be built into the distribution of the protected data. The vendor information may be an identifier created by a third party vendor or industry group. The purpose of this identifier is to allow the vendor or an industry group to add additional layers of security to prevent unauthorized decryption of protected data by a person or software program not approved by the vendor or industry group. For example, as will be discussed below, the vendor information may be retrieved from application software running or playing the protected content, thus further restricting use of the content to devices having licensed copies of the application software. Alternatively, the vendor information may retrieved from a server located on a local area network (LAN), wide area network (WAN), or the Internet, etc.

The user information is a code that is specific to an individual user or group of users. This identifier may be created by the user or on the user's behalf by a software application. The user identification provides for user control over access to the protected content. Such user control may be desirable in corporate environments such that only authorized users (e.g., company officers, specific departments and specific individuals) may access the protected content. In the home, user control will provide parents with a mechanism by which to prevent children from accessing in appropriate content (e.g., R-rated movies).

According to the second embodiment, at step 302A, the vendor information is obtained. Such information may be embedded within the IPM client program which controls the download process at the client side. As such, each vendor would have a unique IPM client program to perform the download process. Alternatively, a single IPM client program may be executed at the client side and the vendor information retrieved from a file on the client PC 20, stand alone device 22, or from information stored on a server 16 (e.g., a LAN, WAN or Internet server) via known processes.

At step 302B, the user information is obtained. This is preferably performed by prompting the user for the information. Alternatively, a separate software application may be invoked to provide the user information (e.g., a password application that retrieves a user's password from a network yellow pages file).

At step 302C, the compound encryption/decryption key is built. The process may be performed by combining the three key components (e.g., the unique serial number of the media 28, the vendor information, and the user information) by any means, including but not limited to, mathematical operations (mod, addition, division, subtraction, XOR, etc.) concatenation, interleaving, or any other method. Preferably, byte level interleaving of the vendor information and the user information is performed. This results in a string having the structure: V0U0V1U1V2U2V3U3V4U4V5U5V6U6V7U7, where Vx is vendor byte x, and Ux is user information byte x. The resulting string is then combined with the unique serial number by an XOR (exclusive OR) operation to form the compound key. Thus, the compound key is preferably created as follows:

CK=S XOR (V interleaved U)
wherein,
  CK=Compound Key
  S=Serial Number
  V=Vendor Information
  U=User Information Both of the above-mentioned embodiments perform substantially similarly upon reaching step 304, whereat the client PC 20 then connects to the server 16 identified in the IPMSERVER tag (e.g., 147.178.20.15 1). The client sends a command packet to the server via TCP/IP sockets at step 304. The first command packet has an action code of one and contains information such as the file name to be transferred, the unique serial number of the media, and if under the second embodiment, the compound key. Optionally, customer information, billing information, etc. may be transferred at this time for use by the E-commerce server 16a in tracking customer purchases, etc. The first command packet may be formatted as follows:

struct SocketCommand
  {
    unsigned long Code;
    unsigned long Size;
    unsigned char Data[400];
  };

Alternatively, the Data field may comprise a plurality of fields containing the customer information, billing information, the unique serial number, the vendor identifier and the user identifier as parsed fields. The data field may be formatted to have the following data structure:

{
    char First[20];
    char Last[20];
    char Address[40];
    char City[20];
    char State[3];
    char Zip[6];
    char CreditCard[17];
    char ExpDate[5];
    char Phone[13];
    char Serial[40];
    char Compound[40];
    long int DataID;
  };

After receiving the first command packet, at step 306, the server 16c contacts the media tracking server 16a to verify that the media's 28 unique identifier is valid and that there is a sufficient balance to cover the cost of the content to be downloaded. The E-commerce server 16c communicates the unique identifier and the cost to the media tracking server 16a by TCP/IP sockets in a data structure such as that noted above with respect to step 206. The media tracking server 16a then looks-up the unique identifier at step 308 in the tracking database, and at step 310, determines the remaining balance. At step 312, the media tracking server 16a determines if the remaining balance is greater than the purchase price of the electronic content. If the remaining balance is greater than the purchase price of the electronic content, then at step 314 the media tracking server 16a responds to the E-commerce server 16c with a positive acknowledgment at step 313, debits the purchase price from the remaining balance associated with the unique identifier, and credits the E-commerce entity's account with the purchase price amount.

If the media 28 does not have a sufficient balance to cover the cost of the electronic content to be downloaded, then at step 324, a rejection process is executed, which will be described with reference to FIG. 8.

Thereafter, at step 314, the E-commerce server 16c responds with a data packet with the same action code and informs the client PC 20 that the file has been opened and the file size. At steps 316–320 the client sends a command packet with an action code of two (step 316), which informs the server to send the next 4000 bytes of data encrypted with the unique serial number. This action code is repeated until the entire file has been transferred from the server 16 to the client PC 20.

During the download process, the server 16 encrypts the data key for the electronic content and/or the electronic content using the unique identifier (first embodiment) or the compound key (second embodiment) as an encryption key (step 318). Additional information may be used in the encryption key, such as the customer information, etc. for additional security. While any suitable encryption algorithm may be utilized at step 318, the data encryption is preferably performed using the well known Blowfish encryption algorithm. The Blowfish encryption algorithm is advantageously fast, especially when implemented on 32-bit microprocessors with large data caches, such as the Intel Pentium and the IBM/Motorola PowerPC. Briefly, Blowfish is a variable-length key, 64-bit block cipher which may be implemented in either hardware or software. The algorithm consists of two parts: a key-expansion part and a data-encryption part. The key expansion part converts a key of at most 448 bits into several subkey arrays totaling 4168 bytes. The data encryption occurs via a 16-round Feistel network, wherein each round consists of a key-dependent permutation and a key- and data-dependent substitution. All operations are exclusive ORs (XOR) and additions on 32-bit words. The only additional operations are four indexed array data look-ups per round to generate the encrypted data.

At step 318, the server transmits the encrypted data to the client, via, e.g., TCP/IP sockets, and the client PC 20 writes the encrypted data to the media 28 at step 320. The data may be written to the media 28 in a standard file system structure or by direct track or sector writes. The format by which the data is written to the media 28 is not limited to the noted formats, as other formats may be utilized. The data transmitted to the client PC 20 from the server 20 is preferably in a predetermined data structure such as the following:

```
struct SocketData
{
  unsigned int Code;
  unsigned long FileSize;
  unsigned char Data[4000];
};
```

The process of step 316–320 repeats until all of the data has been downloaded from the server 16 to the client PC 20. At that time the client PC 20 will send an action code of three to inform the server 16 that the transaction is complete and to disconnect the socket (step 322). If an error occurs during the download process, then an error process is performed at step 326, which will be described with reference to FIG. 9. It is noted that the source code and data structures above are included herein for exemplary purposes only, and are in no way intended to limit the scope of the present invention.

Figure 8:
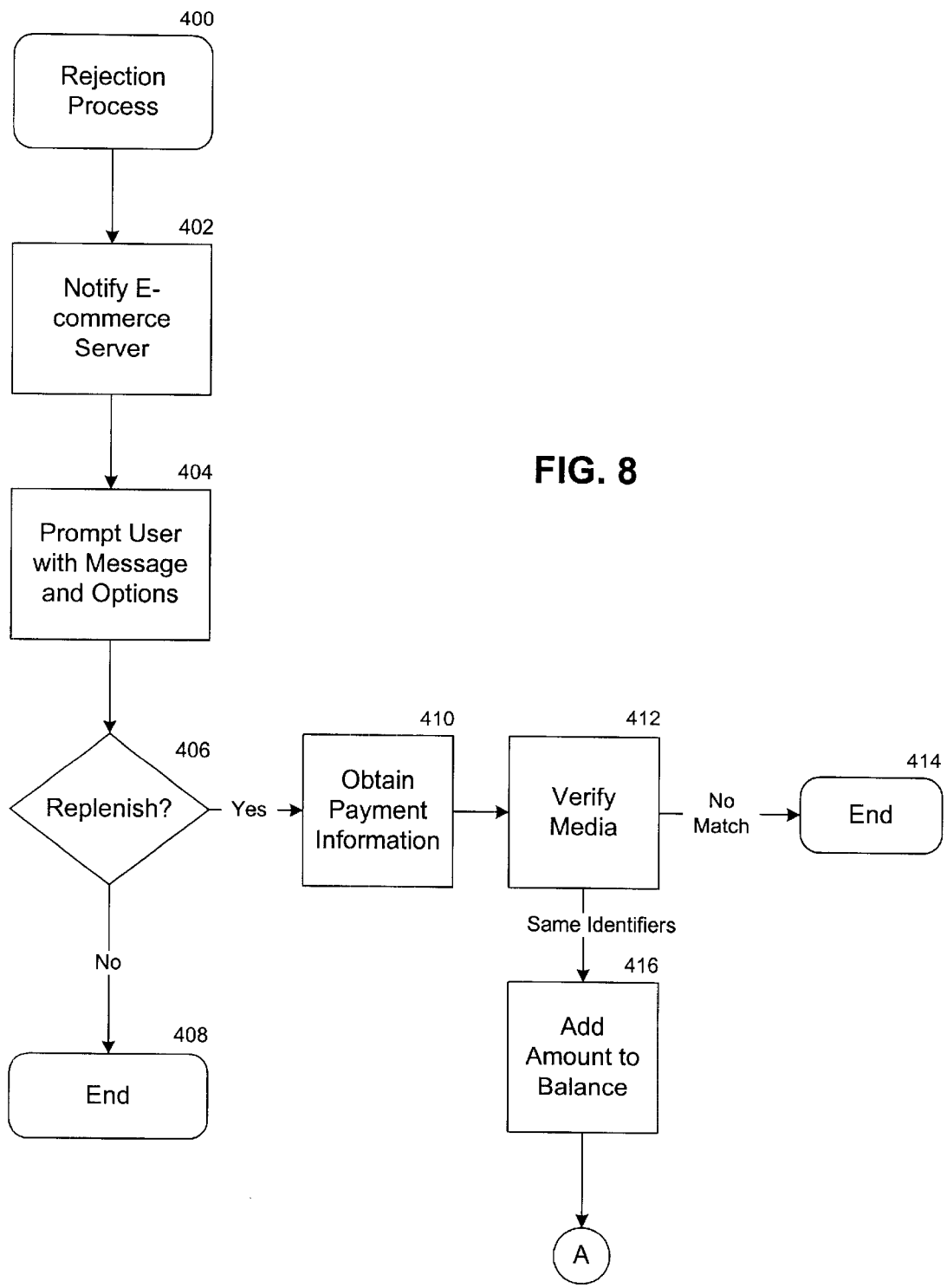
FIG. 8 is a flow chart of the processes performed during a media rejection process encountered during the processes of FIG. 7.

Referring to FIG. 8, there is shown the rejection process (from step 324 in FIG. 7) that is performed if the balance associated with the media's unique identifier is less than the cost of the content to be downloaded. If the media tracking server 16a determines the balance associated with the media's unique identifier is less than the cost of the content to be downloaded (step 400), then the E-commerce server is notified at step 402. Next, an error indication is communicated to the client PC application, via TCP/IP sockets and an appropriate data structure. At step 404 the client application prompts the user with an error message, and preferably asks if the user would like to replenish the prepaid amount of the media 28. The user enters a response at step 312, and if the user selects no, then the application ends at step 408.

If the user selects yes, then the application obtains payment information from the user at step 410. The balance may be replenished using a credit card, electronic transfer from a bank account or investment firm, etc. The client program then verifies that the media 28 in the media drive 52 is the same media from which the unique identifier was read in step 302 by reading the unique identifier again and comparing the two identifiers. If the two identifiers fail to match, then the process ends at 414 and an error message is generated.

If the two identifiers match, then at step 416, the user-selected replenishment amount is approved by known means and added to the balance stored on the media tracking server 16a. From step 416, the process returns to step 306 in FIG. 7 to complete the process.

Figure 9:
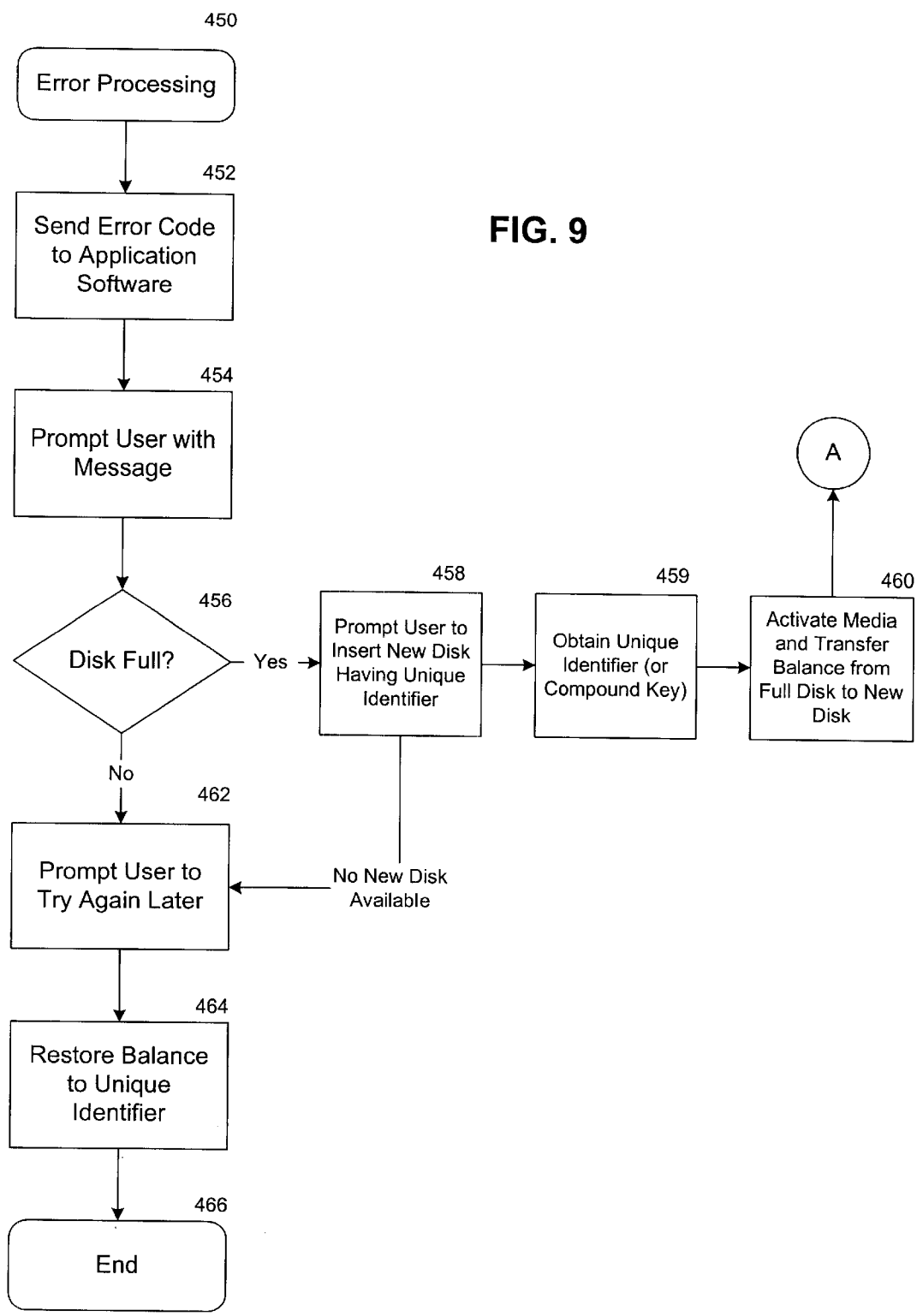
FIG. 9 is a flow chart of the processes performed during an error process encountered during the processes of FIG. 7.

Referring now to FIG. 9, there is illustrated the error process that occurs if an error occurs during the download of the electronic content to the media 28. The process begins at step 450 after the error is encountered, and the E-commerce server 16c sends an error code via TCP/IP sockets and an appropriate data structure to the application software on the PC 20. The application software prompts the user with an error message and determines if the error is a disk full error at step 456. If the error is a disk full error, then at step 458 the user is prompted to insert a new prepaid media disk 28 at step 458. At step 459, the unique identifier of the new media is read (see process of step 302), and if operating in accordance with the second embodiment, the functions of steps 302A, 302B and 302C are also performed to build compound key. The newly inserted media is then activated in accordance with steps 226 and 228. Next, the media tracking server 16a is contacted at step 460 such that the balance (if any) remaining on the full disk is transferred to the new disk and the process jumps to step 306 of FIG. 7.

Under the circumstances where the error is not a disk full error at step 456 then the cause of the error may be due to a variety of problems such as a lost TCP/IP connection, a time out due to high load, a failure at the PC 20, etc. Accordingly, the user is prompted at step 462 by the application software that an error in processing has occurred and that the user should try again. At step 464, the E-commerce server 16c senses that all of the data has not been downloaded to the media 28 and contacts the media tracking server 16a via TCP/IP sockets and an appropriate data structure to restore the prepaid balance of the media 28 by know processes to the balance prior to the present transaction. The error process ends at step 466.

It is noted that if the disk is full and the user does not have another prepaid media disk at step 458, this is treated similarly as an error where the disk is not full (steps 462–466) after the application software detects that a pre-determined period of time has elapsed and a new prepaid media 28 has not been inserted into the media drive 52.

As noted above, the data is stored on the media 28 in an encrypted format using at least the unique serial number as a decryption key. The encryption/decryption key may also be a compound key that includes the unique serial number of the media, vendor information and user information. Accordingly, if the data is copied to any other media, the decryption process will fail rendering the content unusable. Thus, unauthorized copying of data downloaded using the apparatus and method of the present invention will be prevented. Further, while process described above refers to a client PC, the process is applicable to a stand alone device capable of communicating over the network infrastructure, and reading and writing to the media on which the protected electronic data is stored. For example, a kiosk may be provided at retail outlets where purchasers may insert a piece of media 28 into the kiosk and download data to be used on a home or office personal computer.

It is further noted that the E-commerce server 16c may store digital content to be downloaded in an encrypted or unencrypted format. If the digital content to be downloaded is not stored in an encrypted format, then it is preferably encrypted upon downloading using the unique serial number or compound key as an encryption key. If the digital content to be download is stored on the server 16 in an encrypted format (pre-encrypted) prior to downloading then the server would need only encrypt the data key to the content (i.e., the software application, music or video). Pre-encryption may be preferable to provide greater performance in environments where large amounts of data need to be encrypted per transaction. Such electronic distribution systems may be heavily burdened if they were required to encrypt the entire content that is to be electronically distributed. However, it may be preferable to double encrypt the downloaded content at step 308 by encrypting the pre-encrypted content and the data key to the pre-encrypted content using the unique serial identifier or compound key (and any additional information) as an encryption key. Such a technique would greatly increase the security of the data to be transmitted, as the data may be double encrypted prior to transmission to the client, as noted above. While the process at step 318 has identified encrypting the data key or the data key and the content, it is also possible that at step 318 that only the content to be transmitted is encrypted using the unique serial number or compound key as a key. If enhanced security is a concern, additional transaction information such as the purchaser's name, address, credit card number, etc. may be included with the content.

The present invention advantageously utilizes the unique identifier of the media as an encryption key which allows any electronic data to be protected against copying. Additionally, by using the unique identifier of the media, rather than a hardware device, the protected electronic data may be read/played on any device capable of reading the media. Thus, the protected electronic data becomes portable and is tied only to a single removable media, allowing the protected electronic data to be shared while preventing the protected electronic data from being copied and read/played from another media. Further, present invention may be used in a single encryption method or multiple encryption method where the key to the protected electronic data itself is encrypted using the serial number of the disk as the key.

It is noted that the foregoing examples have been provided merely for the purpose of explanation and are in no way to be construed as limiting of the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

For example, fixed media having a unique identifier may be utilized by the present invention to receive protected electronic data. Also, the removable media need not be a removable media cartridge, but may comprise a removable drive, such as those which are removably connected to personal computers or other devices via, e.g., drive bays, device bays, and PCMCIA slots.

What is claimed is:

1. A method of distributing electronic content from a vendor server to a client device via a network infrastructure which includes a Transmission Control Protocol/Internet Protocol Network and for payment to a vendor of the electronic content, said method utilizing a permanent unique identifier stored on a piece of destination media on which the electronic content is to be stored to associate the electronic content with only said piece of media and utilizing a predetermined value stored on said piece of media as payment for the electronic content, said method comprising:

contacting the vendor server via the network infrastructure;

transmitting said unique identifier of said piece of destination media to the vendor server;

communicating, via said network infrastructure information from said vendor server to media tracking server to determine if said unique identifier is valid and to determine a remaining balance of said predetermined value of said piece of media;

encrypting said electronic content into an encrypted format having said unique identifier as a key;

communicating, via the network infrastructure, said encrypted format of said electronic content to said piece of media; and writing the electronic content to said piece of media in accordance with said unique identifier such that the electronic content may be accessed for use from only said piece of media having said unique identifier.

2. The method as recited in claim 1, wherein said step of communicating, via the network infrastructure, information from the vendor server to a media tracking server, further comprises:

determining if said remaining balance is greater than a purchase price of the electronic content;

deducting the purchase price from said remaining balance to determine a new remaining balance if said remaining balance is greater than a purchase price of the electronic content; and sending an acknowledgment to the vendor server prior to communicating the electronic content to said piece of media.

3. The method as recited in claim 2, further comprising crediting an account of the vendor of the electronic content.

4. The method as recited in claim 2, further comprising:

notifying the vendor server that the remaining balance is insufficient to cover the cost of the electronic content if said remaining balance is less than a purchase price of the electronic content;

notifying the client device that said remaining balance is insufficient to cover the cost of the electronic content;

requesting if the remaining balance is to be replenished; and obtaining payment information to replenish the remaining balance.

5. The method as recited in claim 2, said step of communicating, via the network infrastructure, the electronic content to said piece of media, wherein the electronic content is in an encrypted format; further comprising:

determining if an error situation has occurred during the communication of the electronic data;

determining if said piece of media is full; and if so, prompting a user to insert a second piece of media having a second predetermined value and downloading the electronic content to said second piece of media.

6. The method as recited in claim 5, further comprising:

reading a second unique identifier from said second piece of media;

determining, at said media tracking server, if said second piece of media is valid based on said second unique identifier; and transferring said remaining balance from said piece of media to said second piece of media.

7. The method as recited in claim 2, wherein said transmitting said unique identifier to the vendor server further comprises:

accessing said one piece of destination media;

reading said unique identifier from a predetermined location on said one piece of destination media; and formatting said unique identifier into a first data structure for communication to the vendor server.

8. The method as recited in claim 7, wherein said predetermined location on said one piece of destination media is a predetermined track.

9. The method as recited in claim 7, wherein said communicating the electronic content to said piece of media, wherein the said electronic content is in an encrypted format comprises encrypting at least one of the electronic content and an encryption key to the electronic content, said encrypting using said unique identifier as an encryption key.

10. The method as recited in claim 9, wherein the electronic content is written to said one piece of media in an encrypted format using said unique identifier as a decryption key.

11. The method as recited in claim 7, wherein said contacting the vendor server via the network infrastructure comprises:

submitting, from the client device, a form to the vendor server;

executing, at the vendor server, a program to process said form; and sending, to the client device, a metatag and transaction file.

12. The method as recited in claim 11, wherein said metatag and said transaction file launch a client program at the client device after being sent to the client device, and wherein said client program opens said transaction file and parses metadata from metatags within said transaction file.

13. The method as recited in claim 12, wherein the client connects to a server address identified by a predetermined metatag in said transaction file to receive the electronic content.

14. The method as recited in claim 13, wherein said server address is dynamically changed as the electronic content is requested from the vendor server.

15. The method as recited in claim 2, wherein said transmitting said unique identifier to the vendor server further comprises:

accessing said one piece of destination media;

reading said unique identifier from a predetermined location on said one piece of destination media;

obtaining vender information;

obtaining user information;

building a compound key through a predetermined operation using said unique identifier, said vendor information, and said user information; and formatting said compound key into a first data structure for communication to the vendor server with said unique identifier.

16. The method as recited in claim 15, wherein said predetermined location on said one piece of destination media is a predetermined track.

17. The method as recited in claim 15, wherein said step of storing said electronic content in an encrypted format comprises encrypting at least one of the electronic content and an encryption key to the electronic content, said encrypting using said compound key as an encryption key.

18. The method as recited in claim 17, wherein the electronic content is written to said one piece of destination media in an encrypted format using said compound key as a decryption key.

19. The method as recited in claim 15, wherein said contacting the vendor server via the network infrastructure comprises:

submitting, from the client device, a form to the vendor server;

executing, at the vendor server, a program to process said form; and sending, to the client, a metatag and transaction file.

20. The method as recited in claim 19, wherein said metatag and said transaction file launch a client program at the client device after being sent to the client device, and wherein said client program opens said transaction file and parses metadata from metatags within said transaction file.

21. The method as recited in claim 20, wherein the client connects to a server address identified by a predetermined metatag in said transaction file to receive the electronic content.

22. The method as recited in claim 20, wherein said server address is dynamically changed as the electronic content is requested from the vendor server.

23. The method as recited in claim 1 wherein said piece of media is a removable magnetic disk and said unique identifier is the serial number of said disk.

24. A system for distribution of electronic content over a network infrastructure which includes a Transmission Control Protocol/Internet Protocol Network to a client device running an application program, said client device including a piece of media having a permanent unique identifier and a prepaid monetary value inserted therein, said system further compensating a vendor of the electronic content from a remaining balance of said prepaid monetary value, said system comprising:

a vendor server containing the electronic content and offering the electronic content for downloading to said client device via said network infrastructure;

a media tracking server that maintains said remaining balance of said piece of media in accordance with said unique identifier;

wherein said unique identifier is communicated to said vendor server and said vendor server communicates said unique identifier to said media tracking server to determine said remaining balance, and wherein said vendor server encrypts the electronic content with said unique identifier as a key and downloads the encrypted electronic content to said piece of media such that the electronic content may only be accessed from said piece of media.

25. The system as recited in claim 24, wherein said media tracking server determines if said remaining balance is greater than a purchase price of the electronic content, wherein said media tracking server debits the purchase price from said remaining balance to determine a new remaining balance if said remaining balance is greater than a purchase price of the electronic content; and wherein said media tracking server sends an acknowledgment to said vendor server prior to communicating the electronic content to said piece of media.

26. The system as recited in claim 25, wherein said media tracking server credits an account of the vendor of the electronic content.

27. The system as recited in claim 25, wherein said media tracking server notifies the vendor that the remaining balance is insufficient to cover the cost of the electronic content if said remaining balance is greater than a purchase price of the electronic content, and wherein said vendor server requests if said remaining balance is to be replenished and payment information to replenish the remaining balance is communicated via said application software to said media tracking server.

28. The system as recited in claim 25, wherein said vendor server determines if an error situation has occurred during the communication of the electronic data and determines if said piece of media is full, and wherein if said media is full, said application software requests that a second piece of media having a second predetermined value be inserted into said client device, and said vendor server resumes downloading the electronic content to said second piece of media.

29. The system as recited in claim 28, said application software reading a second unique identifier from said second piece of media, and wherein said media tracking server determines if said second piece of media is valid based on said second unique identifier and transfers said remaining balance from said piece of media to said second piece of media.

30. The system as recited in claim 25, wherein said application software accesses said one piece of destination media and reads said unique identifier from a predetermined location on said one piece of destination media, and wherein said application software formats said unique identifier into a first data structure for communication to the vendor server.

31. The system as recited in claim 30, wherein said predetermined location on said piece of media is a predetermined track.

32. The system as recited in claim 30, wherein the electronic content to be transmitted to the client device is encrypted using said unique identifier as an encryption key.

33. The system as recited in claim 32, wherein the electronic content is written to said piece of media in an encrypted format using said unique identifier as a decryption key.

34. The system as recited in claim 25, wherein said application software accesses said piece of destination media and reads said unique identifier from a predetermined location on said piece of destination media, obtains vender information, and obtains user information, wherein said application software builds a compound key through a predetermined operation using said unique identifier, said vendor information, and said user information, and wherein said application software formats said compound key into a first data structure for communication to the server with said unique identifier.

35. The system as recited in claim 34, wherein said predetermined location on said piece of destination media is a predetermined track.

36. The system as recited in claim 34, wherein the electronic content to be transmitted is encrypted using said compound key as an encryption key.

37. The system as recited in claim 36, wherein the electronic content is written to said piece of destination media in an encrypted format using said compound key as a decryption key.

38. The system as recited in claim 24 wherein said piece of media is a removable magnetic disk and said unique identifier is the serial number of said disk.

* * * * *

UNITED STATES PATENT AND TRADEMARK OFFICE
CERTIFICATE OF CORRECTION

PATENT NO.   : 6,434,535 B1
DATED        : August 13, 2002
INVENTOR(S)  : Kupka et al.

It is certified that error appears in the above-identified patent and that said Letters Patent is hereby corrected as shown below:

<u>Column 14,</u>
Line 14, "<IPMDATE:> May 4, 1998" should be -- -<IPMDATE:> 3/4/98 --

Signed and Sealed this

Fourth Day of February, 2003

JAMES E. ROGAN
*Director of the United States Patent and Trademark Office*